US009178917B2

(12) United States Patent
Mosko et al.

(10) Patent No.: US 9,178,917 B2
(45) Date of Patent: *Nov. 3, 2015

(54) CUSTODIAN ROUTING WITH NETWORK ADDRESS TRANSLATION IN CONTENT-CENTRIC NETWORKS

(75) Inventors: Marc E. Mosko, Santa Cruz, CA (US); Simon Barber, San Francisco, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 697 days.

This patent is subject to a terminal disclaimer.

(21) Appl. No.: 12/970,826

(22) Filed: Dec. 16, 2010

(65) Prior Publication Data

US 2012/0158862 A1     Jun. 21, 2012

(51) Int. Cl.
*G06F 15/16* (2006.01)
*H04L 29/06* (2006.01)
*H04L 29/12* (2006.01)

(52) U.S. Cl.
CPC ........ *H04L 65/1069* (2013.01); *H04L 65/1096* (2013.01); *H04L 29/12509* (2013.01); *H04L 29/12528* (2013.01); *H04L 29/12594* (2013.01); *H04L 61/2567* (2013.01); *H04L 61/2575* (2013.01); *H04L 61/30* (2013.01)

(58) Field of Classification Search
CPC ............ H04L 29/125; H04L 29/12509; H04L 29/12566; H04L 61/2567; H04L 61/2589; H04L 61/2564
USPC .......................... 709/206, 237, 217, 227, 218
See application file for complete search history.

(56) References Cited

U.S. PATENT DOCUMENTS

| | | | | |
|---|---|---|---|---|
| 6,654,792 | B1 * | 11/2003 | Verma et al. ................... | 709/208 |
| 7,257,837 | B2 * | 8/2007 | Xu et al. .......................... | 726/12 |
| 7,509,425 | B1 | 3/2009 | Rosenberg | |
| 7,685,290 | B2 * | 3/2010 | Satapati ......................... | 709/231 |
| 8,224,985 | B2 * | 7/2012 | Takeda .......................... | 709/237 |
| 2002/0176404 | A1 * | 11/2002 | Girard ........................... | 370/352 |
| 2004/0139230 | A1 * | 7/2004 | Kim ............................... | 709/245 |
| 2005/0289222 | A1 * | 12/2005 | Sahim ........................... | 709/206 |
| 2006/0133343 | A1 * | 6/2006 | Huang ........................... | 370/349 |
| 2006/0193295 | A1 * | 8/2006 | White et al. ................... | 370/336 |
| 2007/0195765 | A1 * | 8/2007 | Heissenbuttel et al. ........ | 370/389 |

(Continued)

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.

(Continued)

*Primary Examiner* — Madhu Woolcock
(74) *Attorney, Agent, or Firm* — Shun Yao; Park, Vaughan, Fleming & Dowler LLP (57) ABSTRACT

One embodiment of the present invention provides a system for facilitating establishment of connections between a local endpoint and a remote endpoint. During operation, the system sends, from the local endpoint, a single connection-request message to a proxy server, which forks the single connection-request message to a number of remote endpoints. The system receives one or more response messages from the remote endpoints. A respective response message carries address information associated with the remote endpoint. Upon receiving the response message, the system sends an acknowledgment corresponding to the received response message to the corresponding remote endpoint via the proxy server, and establishes a connection between the local endpoint and at least one remote endpoint.

23 Claims, 5 Drawing Sheets

(56) References Cited

U.S. PATENT DOCUMENTS

| | | | |
|---|---|---|---|
| 2007/0253418 A1* | 11/2007 | Shiri et al. | 370/392 |
| 2008/0101357 A1* | 5/2008 | Iovanna et al. | 370/389 |
| 2008/0159271 A1* | 7/2008 | Kutt et al. | 370/352 |
| 2009/0077184 A1* | 3/2009 | Brewer et al. | 709/206 |
| 2009/0157887 A1* | 6/2009 | Froment et al. | 709/228 |
| 2009/0323632 A1* | 12/2009 | Nix | 370/331 |
| 2010/0057929 A1* | 3/2010 | Merat et al. | 709/231 |
| 2010/0124191 A1* | 5/2010 | Vos et al. | 370/328 |
| 2010/0182995 A1* | 7/2010 | Hwang et al. | 370/352 |
| 2010/0232402 A1* | 9/2010 | Przybysz | 370/338 |
| 2010/0235516 A1* | 9/2010 | Nakamura et al. | 709/227 |
| 2011/0202609 A1* | 8/2011 | Chaturvedi et al. | 709/206 |
| 2011/0264824 A1* | 10/2011 | Venkata Subramanian et al. | 709/238 |
| 2011/0299454 A1* | 12/2011 | Krishnaswamy | 370/328 |

OTHER PUBLICATIONS

Jacobson, Van et al., "VoCCN: Voice-over Content-Centric Networks", Dec. 1, 2009, pp. 1-6.

Shih, Eugene et al., "Wake on Wireless: An Event Driven Energy Saving Strategy for Battery Operated Devices", Sep. 2002, pp. 160-171.

\* cited by examiner

FIG. 1

LOCAL HOST

|  | No NAT | FC | AC | PC | PS | RS |
|---|---|---|---|---|---|---|
| No NAT | Y | Y | Y | Y | Y | Y |
| FC | Y | Y | Y | Y | Y | Y |
| AC | Y | Y | Y | Y | Y | Y |
| PC | Y | Y | Y | Y | Y | N |
| PS | Y | Y | Y | Y | Y | N |
| RS | Y | Y | Y | N | N | N |

REMOTE HOST

LOCAL HOST

|  | No NAT | FC | AC | PC | PS | RS |
|---|---|---|---|---|---|---|
| No NAT | Y | Y | Y | Y | Y | Y |
| FC | Y | Y | Y | Y | Y | Y |
| AC | Y | Y | Y | Y | Y | Y |
| PC | Y | Y | Y | Y | N | N |
| PS | Y | Y | Y | Y | N | N |
| RS | Y | Y | Y | N | N | N |

REMOTE HOST

CUSTODIAN ROUTING WITH NETWORK ADDRESS TRANSLATION IN CONTENT-CENTRIC NETWORKS

RELATED APPLICATION

The subject matter of this application is related to the subject matter of the following applications:

U.S. patent application Ser. No. 12/123,344, entitled "VOICE OVER CONTENT-CENTRIC NETWORKS," by inventors Paul J. Stewart, Van L. Jacobson, Michael F. Plass, and Diana K. Smetters, filed 19 May 2008;

U.S. patent application Ser. No. 12/332,560, entitled "METHOD AND APPARATUS FOR FACILITATING COMMUNICATION IN A CONTENT-CENTRIC NETWORK," by inventor Van L. Jacobson, filed 11 Dec. 2008;

U.S. patent application Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009;

U.S. patent application Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed 15 Dec. 2009;

U.S. patent application Ser. No. 12/640,968, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009;

U.S. patent application Ser. No. 12/970,740, entitled "CUSTODIAN-BASED ROUTING IN CONTENT-CENTRIC NETWORKS," by inventors Van L. Jacobson and Marc E. Mosko, filed 16 Dec. 2010;

U.S. patent application Ser. No. 12/970,776, entitled "ENERGY-EFFICIENT CACHING WITH CUSTODIAN-BASED ROUTING IN CONTENT-CENTRIC NETWORKS," by inventor Van L. Jacobson, filed 16 Dec. 2010; and U.S. patent application Ser. No. 12/970,802, entitled "ENERGY-EFFICIENT CONTENT RETRIEVAL IN CONTENT-CENTRIC NETWORKS," by inventor Van L. Jacobson, filed 16 Dec. 2010; and U.S. patent application Ser. No. 12/970,819, entitled "SIP-BASED CUSTODIAN ROUTING IN CONTENT-CENTRIC NETWORKS," by inventors Marc E. Mosko and Simon Barber, filed 16 Dec. 2010;

the disclosures of which are incorporated by reference in their entirety herein.

FIELD

The present disclosure relates generally to routing in content-centric networks. More specifically, the present disclosure relates to an apparatus and a method for facilitating session initiation protocol (SIP)-based custodian routing in a content-centric network with firewalls.

RELATED ART

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of data can only receive the data by explicitly requesting the data from an address (e.g., Internet protocol (IP) address) closely associated with a physical object or location. This restrictive addressing scheme is becoming progressively inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today' subiquitous, relentlessly growing Internet. People now expect a lot more from the Internet than the ARPAnet was designed to provide. Ideally, an Internet user should have access to any content, anywhere, at any time—a task that is difficult to perform with the current location/device-binding TCP/IP (transmission control protocol/Internet protocol) networks.

Content-centric networks (CCNs), also referred to as "content-based networks," bring a new approach to data transport in a network. Instead of having network traffic viewed at the application level as end-to-end conversations over which content travels, content is requested or returned based on the name given to it, and the network is responsible for routing data, or "content," from the provider to the consumer.

SUMMARY

One embodiment of the present invention provides a system for facilitating establishment of a connection between a local endpoint and a remote endpoint. During operation, the system sends, from the local endpoint, a single connection-request message to a proxy server, which forks the single connection-request message to a number of remote endpoints. The system receives one or more response messages from the remote endpoints. A respective response message carries address information associated with the remote endpoint. Upon receiving the response messages, the system sends an acknowledgment corresponding to the received response message to a remote endpoint associated with the received response message via the proxy server, and establishes at least one connection between the local endpoint and the multiple remote endpoints.

In one variation on this embodiment, the local endpoint, the remote endpoints, or both are respectively behind a network address translation (NAT) firewall.

In a further variation, the system further determines the type of NAT firewall behind which the local endpoint resides, and in response to the local endpoint not being behind any NAT or behind a cone type NAT, the system sends a single connection-request message to the proxy server. The connection-request message carries address and port information associated with the external side of the NAT through which the local endpoint can be reached, or if no NAT is detect then the local endpoint.

In one variation on this embodiment, the proxy server is a session initiation protocol (SIP) proxy server, and the connection-request message is a SIP INVITE message without session description protocol (SDP) payload.

In a further variation, the response message is a SIP provisional response or a 200/OK message which carries a session description protocol (SDP) offer.

In a further variation, the SDP offer includes a list of addresses corresponding to the remote endpoint associated with the response message. The list of addresses includes a NAT external address and may also include a local address and port, and/or an external relay address.

In a further variation, the acknowledgement is a SIP provisional response acknowledgement (PRACK) or acknowledgment (ACK) message, and the SIP PRACK or ACK message carries a session description protocol (SDP) answer.

In a further variation, the SDP answer includes a list of addresses corresponding to the local endpoint. The list of addresses includes at least one of: a local address and port, a NAT external address and port, and an external relay address.

In one variation on this embodiment, the system further determines whether one or more remote endpoints are in an energy-saving sleep mode. In response to the one or more remote endpoints being in the energy-saving sleep mode, the system wakes up at least one of the remote endpoints using an out-of-band signal.

In a further variation, the out-of-band signal includes a telephone call, a text message, or both.

In one variation on this embodiment, the local endpoint and the remote endpoint are coupled to a content-centric network (CCN).

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide session initiation protocol (SIP)-based rendezvous that facilitate custodian routing in content-centric networks (CCNs) with firewalls. In embodiments of the present invention, a custodian for content periodically registers with a SIP proxy, which maintains information for a number of endpoints associated with the custodian. When a content requester attempts to establish a connection with at least one communication endpoint of the custodian, it sends a SIP INVITE that contains no session description protocol (SDP) payload to the SIP proxy, which then replicates the payload-less SIP INVITE and sends one INVITE to each endpoint associated with the custodian. When an endpoint of the custodian responds to the INVITE, it sends a SIP 200/OK message including a SDP payload to the content requester via a SIP proxy server, making this message a SDP offer. By responding to the SDP offer with an SDP answer (in a SIP ACK message), the content requester sends its own connection information to an endpoint on the custodian. Consequently, multiple SIP sessions can be established between the content requester and the custodian across various types of network address translation (NAT) firewalls, including certain types of symmetric NAT firewalls.

Although the present disclosure is presented using examples based on the CCN, embodiments of the present invention are not limited to the CCN.

The term "custodian" refers to a device that stores the content of interest. A custodian can be any type of device that is capable of storing data in volatile or non-volatile storage. A custodian can be a mobile computing device, such as a laptop computer, a tablet or slate computer, a smartphone, or a personal digital assistant (PDA), or a stationary computing device, such as a desktop computer or a home media server.

The term "communication endpoint" refers to a communication interface located on a computing device, through which a remote device can communicate with the computing device. A "communication endpoint" can be any type of communication interface, including, but not limited to: a WiFi™ (trademark of the Wi-Fi Alliance) interface, a 3G cellular interface, and a Bluetooth™ (trademark of the Bluetooth Special Interest Group of Kirkland, Wash.) interface.

Content-Centric Network

In a content-centric network (CCN), communication is driven by the consumers of data. In a CCN, there are two packet types, interest packet and data packet. An interest packet (also called a "query") is a request for some content. An interest packet encodes a special form of query that expresses what content is desired and what content is not desired. A data packet (also called a "content packet") is a unit of content. Data packets are self-identifying by carrying within them their full name. A consumer asks for content by broadcasting its interest over all available connectivity. Any node hearing the interest and having data that satisfies it can respond with a data packet. Data is transmitted only in response to an interest and consumes that interest. Both interest and data identify the content being exchanged by the content name (or CCN name). In one embodiment, data can "satisfy" an interest if the CCN name in the interest packet is a prefix of the CCN name in the data packet.

CCN names are opaque, binary objects composed of an explicitly specified number of components. In addition, CCN names are persistent and content-specific. That is, if one changes the content of a file or data object, the content is effectively associated with a new name. This persistency can be achieved with an explicit versioning mechanism where, for example, the new content can be "version 4" of a given name. The persistency can also be achieved implicitly. For example, contents can be associated with not only their human-established names but also with authentication metadata (e.g., a digital signature by the publisher of the content). As a result, the complete content name changes when the data associated with a given name changes.

Functionally, a CCN can retain associations among various names and the content which they represent. The names are hierarchically structured, have variable length, and in many situations can be understood by a user. For example, "/abcd/bob/papers/ccn/news" could be the name of an article, i.e., the "news" article from the "ccn" collection of papers for a user named "Bob" at the organization named "ABCD." In a CCN, from an application's perspective, there is no need for a content consumer to determine how to find the "ABCD" organization, or to find which host there holds Bob's CCN publications. In one embodiment, to request a piece of content, a device in the CCN registers with the network that it is interested in that content by its name, and the content, if available in the local network, is routed back to it. The routing infrastructure takes care of intelligently propagating the interest to the prospective publishers, and then carrying any available content back along the path which the interest traversed.

CCNs have additional properties which make them especially appealing. All content can be cryptographically authenticated, meaning that some subset of nodes on the network (e.g., a legitimate querier of the content) can verify the authenticity of a piece of content. CCNs also allow data to be accessed by name, independent of publisher. At the same time, one can tailor a specialized request for data by a certain publisher. For example, one can ask for "foo.txt," or "foo.txt signed by Bob." Any form of self-verifying name can be used as a contract between producer and consumer. It is also possible to use hybrid self-verifying names, where the former components of the name are for organization and efficient routing, and the latter components of the name are self-verifying. Finally, CCNs allow the separation of content and trust, enabling different data consumers to use different mechanisms for establishing trust in the same piece of content. Although content might have been signed by a single publisher, it can be trusted for different reasons. For example, one user might trust a given piece of content because of a direct personal connection with its signer, whereas another user might trust the same content because of the content signer's participation in a Public Key Infrastructure (PKI) which that user has chosen to trust.

Custodian-Based Routing

To enable content sharing among various user devices within a social network group, custodian-based routing can be implemented over a CCN-based content delivery network (CDN) that includes various user devices. In a CDN implementing custodian-based routing, content is associated with devices storing it, called custodians. A request for a particular piece of content can always be routed to its custodian, regardless of the physical location of the custodian.

To ensure that the requesting party of a piece of content can correctly connect to the custodian of that content, the CCN-based CDN maintains three different types of mapping, including content-prefix-to-custodian mapping, custodian-to-communication-endpoint mapping, and communication-endpoint-to-physical-address mapping. Each time a device interacts with another device, they exchange the three mappings with each other to make sure that the routing information is distributed across the CDN. Alternatively, the communication-endpoint-to-physical-address mapping information can be stored at a third-party service, such as a public session initiation protocol (SIP) server which provides rendezvous service between the requesting party and the custodian.

Details about custodian-based routing can be found in U.S. patent application No. TBD, entitled "CUSTODIAN-BASED ROUTING IN CONTENT-CENTRIC NETWORKS," by inventors James D. Thornton, Van L. Jacobson, and Marc Mosko, filed TBD, the disclosure of which is incorporated by reference in its entirety herein.

NAT Traversal

Figure 1:
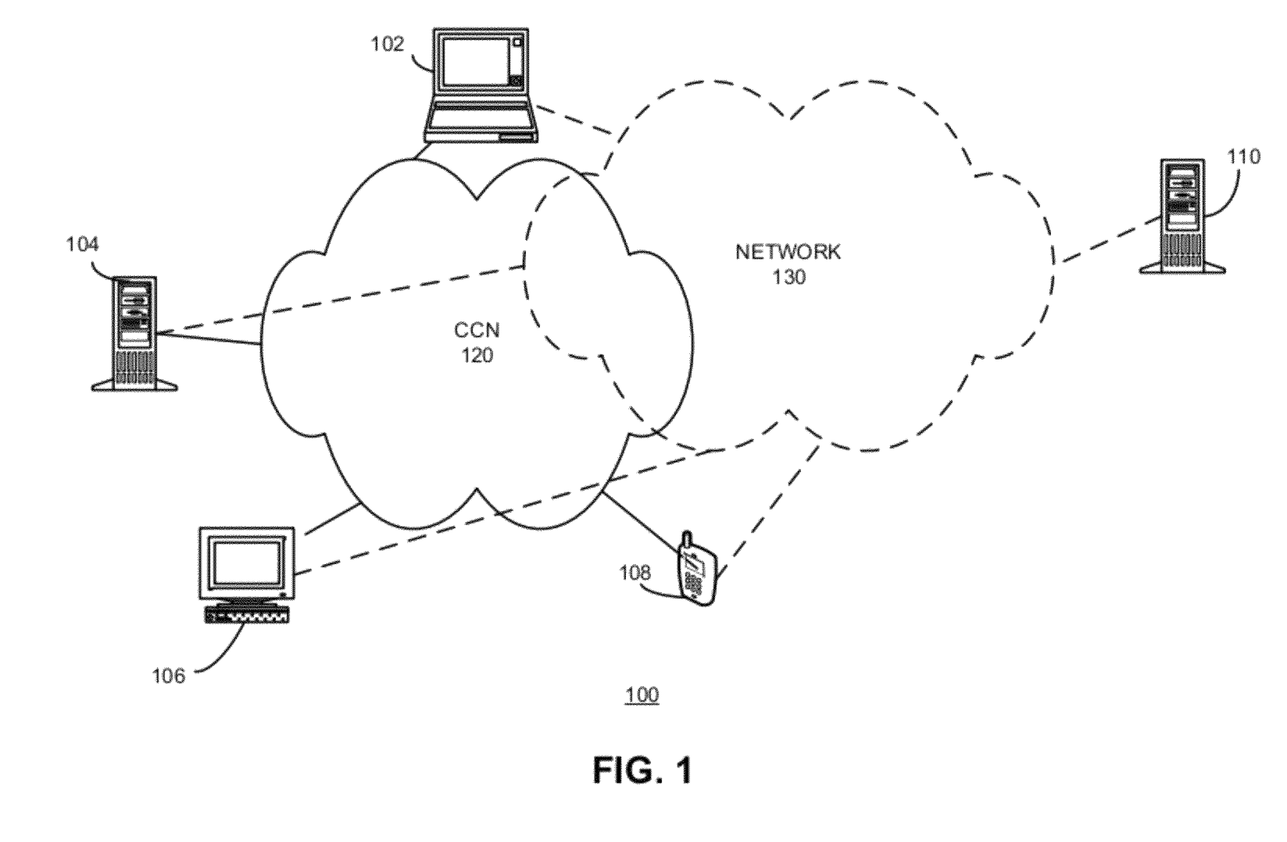
FIG. 1 presents a diagram illustrating the exemplary system architecture for custodian routing in accordance with an embodiment of the present invention.

FIG. 1 presents a diagram illustrating the exemplary system architecture for custodian routing in accordance with an embodiment of the present invention. System 100 includes a number of devices, such as a laptop computer 102, a media server 104, a desktop computer 106, a smartphone 108, and a proxy server 110. Laptop computer 102, media server 104, desktop computer 106, and smartphone 108 are coupled to both a CCN 120 and a conventional network 130, such as an IP-based network. Proxy server 110 is coupled to conventional network 130. In one embodiment, proxy server 110 is a SIP proxy server. Note that CCN 120 can also be overlaid on top of conventional network 130.

During operation, laptop computer 102 requests a piece of content, and after performing content-prefix-to-custodian mapping, laptop computer 102 determines that smartphone 108 is the custodian of such content, and identifies that smartphone 108 has two logical endpoints. Note that a logical endpoint is a high-level representation of a physical communication endpoint, and is possibly combined with a rendezvous mechanism. In one embodiment, a custodian publishes a logical-endpoint entry for each way in which the custodian may be contacted. For example, the two logical endpoints of smartphone 108 may include a WiFi endpoint and a 3G cellular endpoint, and smartphone 108 may publish the entries as: "cell_sip," "wifi_sip," and "wifi_homenet." These entries tell other parties, such as laptop computer 102, how to connect to smartphone 108. For example, "cell_sip" and "wifi_sip" mean that its cellular and WiFi interfaces can be reached by establishing a point-to-point tunnel negotiated via SIP, and "wifi_homenet" means that the WiFi interface can also be connected to directly if smartphone 108 is on the home (trusted) WiFi network.

In one embodiment the content-prefix-to-custodian mapping and custodian-to-logical-endpoint mapping are exchanged/distributed among all devices coupled to CCN 120 whenever these devices communicate with each other. Subsequently, the identified logical endpoints are mapped to their network endpoint identifiers (NEIs), which are network addressees, such as IP sockets (IP addresses and ports). Note that the logical-endpoint-to-NEI mapping is dynamic, because a logical endpoint's NEI can change frequently. For example, the NEI of the WiFi interface of smartphone 108 changes whenever smartphone 108 is coupled to a different WiFi hotspot. In addition, the logical-endpoint-to-NEI mapping often involves issues arising from the presence of network address translation (NAT) firewalls. More specifically, in the case where a custodian includes multiple logical endpoints, trying to establish connections with the multiple endpoints can be challenging in the presence of NAT firewalls.

Device routing in the presence of NAT requires a NAT traversal process, such that an endpoint may find the current network address of another endpoint, thus enabling establishment of connection between the two endpoints. There are six different endpoints scenarios, including one in which an endpoint is not behind a NAT and scenarios where an endpoint is behind one of the five types of NATs. The five types of NAT include: full-cone NAT, address-restricted cone (AC) NAT, port-restricted cone (PC) NAT, predictable symmetric (PS) NAT, and randomized symmetric (RS) NAT.

Cone NATs are NATs that always map any particular internal address and port combination to the same external address and port combination, as long as the NAT binding is kept alive. Therefore, multiple connections can be made from the same internal address and port to different remote addresses and ports, and all the connections will appear to come from the same NAT external address and port. Depending on the filtering ability, cone NATs are also categorized as Fiber Channel (FC) NAT, AC NAT, and PC NAT.

If an endpoint is behind a FC NAT, once the NAT binding is created, any remote external address and port can send data to the NAT external address and port and the data will be forwarded to the internal host address and port. There is no filtering here, and as soon as the NAT binding is created, anyone on the Internet can use it to send data to that particular internal host address and port. FC NAT is the least restrictive kind of NAT, and is the easiest to traverse, but opens up the highest security risk.

An AC NAT adds some address filtering. If an endpoint is behind an AC NAT, only remote external addresses that have a NAT binding open to them can send data back to the internal address, yet those remote external hosts can do so from any port number—not just the port the binding was opened to. AC NAT implements a simple address filter to prevent anyone on the Internet using the NAT binding by limiting the IP addresses that can send data to the internal host through the NAT to those external hosts that has previously received data from the internal host. AC NAT provides better security than an FC NAT, but is still relatively easy to traverse.

A PC NAT adds further port filtering. In the situation where a PC NAT is implemented, when a NAT binding is set up from an internal address and port to a remote external address and port, only that exact remote address and port can send data back to the internal address and port through the PC NAT.

A Symmetric NAT is different from a Cone NAT. Symmetric NATs map each connection, defined by a 4 tuple (local internal address, local internal port, remote address, remote port), to a different NAT external address and port. Symmetric NATs are substantially harder to traverse, and in some cases it is impractical to traverse a symmetric NAT. Symmetric NATs can be divided into 2 classes, including the predictable symmetric (PS) NAT and the randomized symmetric (RS) NAT. Note that a large NAT box may have a number of external addresses, although normally the number is normally relatively small.

A PS NAT refers to a symmetric NAT that allocates its external address/port combinations in a predictable fashion. For example, consecutive connections through the PS NAT may be mapped to sequential external port numbers. Both the loading of the NAT box and the internal algorithm for allocating NAT bindings affect the predictability. The predictability can be discovered by performing a number of test connections to a test server (more than one server address is required), and looking for patterns in the external addresses used by the NAT box.

An RS NAT refers to a NAT box that hands out apparently random address and port combinations. An RS NAT box may maintain an unordered list of unused mappings, and returns mappings to the start or end of the list as they time out, which will over time randomize the list. Consequently, a subsequent connection is mapped to an apparently random address/port combination. Lightly loaded symmetric NATs, such as those used in homes or small businesses are often predictable. Heavily loaded symmetric NATs, such as those used by service providers or large corporations, are frequently not predictable because many ports are in use and the pattern of available ports becomes quickly randomized regardless of allocation algorithm in use.

NAT traversal is required to establish an endpoint-to-endpoint connection in the presence of NAT. A common method used for NAT traversal is based on the interactive connectivity establishment (ICE) protocol. ICE involves the local host sending an offer with a list of possible connection addresses (including ports) for the local host to a remote host via a third party. This list of the possible connection addresses and ports includes an address and port for each of the host's local interfaces (usually only one), as well as the external address and port for any NAT box the host is behind. The NAT external address and port is usually determined by sending packets out to a well-known server on the external network, which replies with the address it observed from which the requests are sent. The session traversal utilities for NAT (STUN) protocol can be used for this purpose. By sending out several such requests to at least two servers, a client can determine what type of NAT it is behind, and predict an address it will be reachable by almost all NAT cases, except the RS NAT. Optionally, a third type of address is included, which is the address of an external relay server. The relay server allows the endpoint to be reached in cases where the NAT is not traversable. The traversal using relay NAT (TURN) protocol can be used to setup and discover an external relay address. Upon receiving the list of possible connection addresses and ports for the local host, the remote host responds with a list of its own possible connection addresses and ports, which are generated in the same way. As soon as each host obtains the list of the possible connection addresses and hosts for the other host, each tries to establish all possible connections between each other. The various combinations are prioritized to test links that are likely to be faster or more efficient first (likely in the order of local interfaces, NAT box external interfaces, and the relay server). This process stops when the 2-way communication is established.

Figure 2:
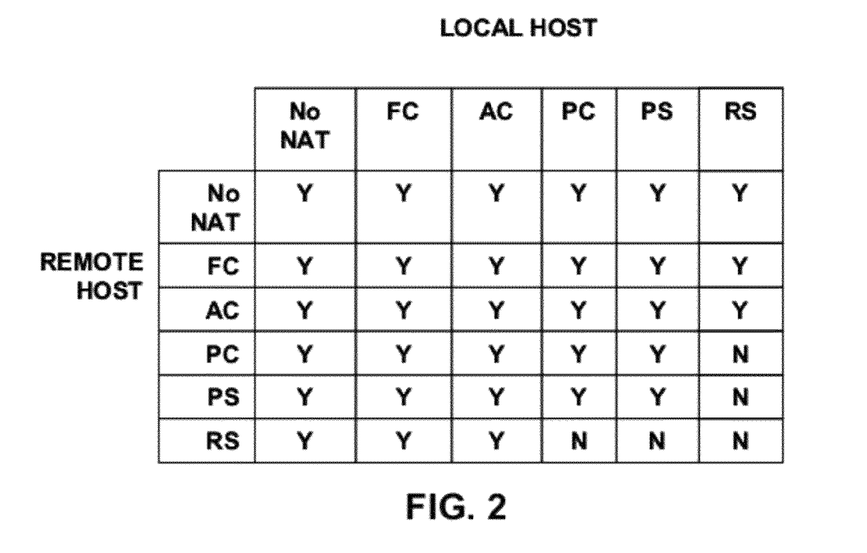
FIG. 2 presents a diagram illustrating whether NAT traversals are possible when establishing endpoint-to-endpoint connections for all combination of NATs.

When setting up an endpoint-to-endpoint connection across NAT boxes, a third party, such as a SIP proxy server on a public network, is required to relay setup messages between the endpoints. Note that, as explained earlier, not all NAT situations are traversable. FIG. 2 presents a diagram illustrating whether NAT traversals are possible when establishing endpoint-to-endpoint connections for all combination of NATs. As one can see from FIG. 2, if one of the endpoint is behind an RS NAT, and the other endpoint is behind a PC NAT, a PS NAT, or a RS NAT, NAT traversal becomes impossible and an external relay server will be needed in order for the two endpoints to communicate.

Point-to-Multipoint Connection Across NAT

In addition to setting up an endpoint-to-endpoint connection across NATs, the third party can also set up multiple connections from one local endpoint to multiple remote endpoints. For example, a SIP proxy server can fork a single SIP INVITE message to multiple SIP endpoints that are registered with the SIP proxy. Such a process can happen when the multiple endpoints are all registered with the same address of record (AOR) on the SIP proxy, or when the original INVITE is addressed to a group name that was expanded to a list of multiple addresses. The presence of NAT boxes in front of the endpoints can impose further challenges for setting up point-to-multipoint connections.

Figure 3:
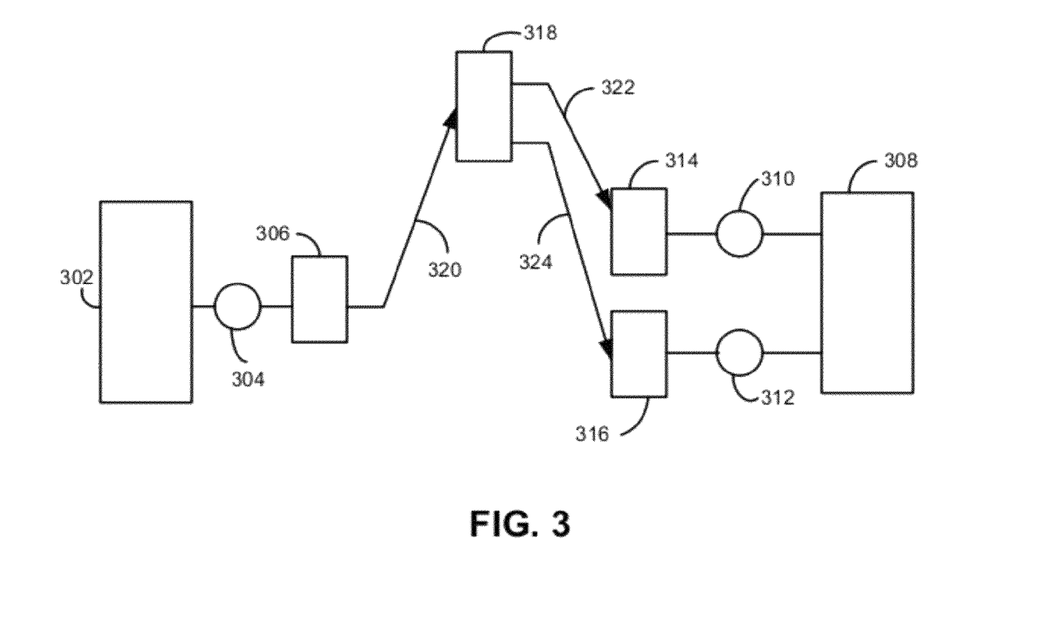
FIG. 3 presents a diagram illustrating an exemplary scenario where a proxy attempts to setup point-to-multipoint (forked) connections.

FIG. 3 presents a diagram illustrating an exemplary scenario where a proxy attempts to setup point-to-multipoint connections. In FIG. 3, a local device 302 includes an interface 304 behind a NAT box 306. A remote device 308 includes a number of interfaces 310-312 behind NAT boxes 314 and 316, respectively. Also included in FIG. 3 is a proxy server 318. From FIG. 3, one can see that local device 302 can communicate with remote device 308 via connections from interface 304 to interfaces 310 and 312. Because all interfaces are behind NAT firewalls, proxy server 318 is needed to relay the setup messages. During operation, interface 304 sends out a connection-request message 320, such as a SIP INVITE, to proxy server 318. Proxy server 318 makes multiple copies of connection-request message 320, including connection-request messages 322 and 324, and subsequently sends out connection-request messages 322 and 324 to interfaces 310 and 312, respectively.

The forking of the connection-request message at the proxy can further complicate the NAT traversal process. In a conventional system, the local address binding is sent out in the connection-request message, which only includes one address and port combination, thus limiting the ability for establishing multiple connections. This is not a problem if the NAT is a Cone NAT because a Cone NAT allows multiple connections to be made from this one address and port. However, if the Nat is a symmetric NAT, the multiple connections may fail because only a single connection can be made using a single NAT external address and port mapping. Consequently, the first responder to the forked invite may successfully connect, but subsequent ones will fail.

Figure 4:
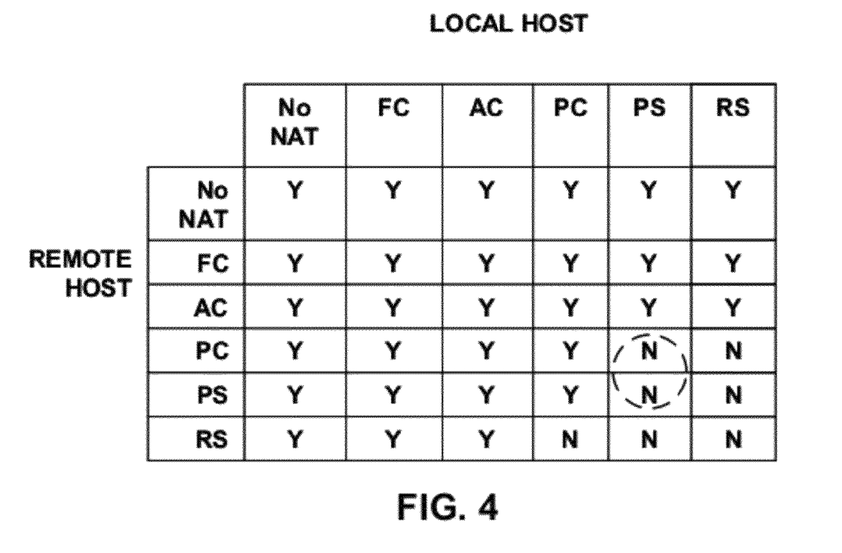
FIG. 4 presents a diagram illustrating whether multiple NAT traversals are possible when establishing point-to-multipoint (forked) connections for all combination of NATs.

FIG. 4 presents a diagram illustrating whether multiple NAT traversals are possible when establishing point-to-multipoint connections for all combination of NATs. Compared with FIG. 2, one can see that in FIG. 4, two additional situations where NAT traversal becomes impossible. When the local host (the one sending out the connection-request message) is behind a PS NAT, NAT traversal for point-to-multipoint connections can fail if the remote hosts (or endpoints) are behind a PC NAT or a PS NAT. In other words, the system may fail to establish multiple connections successfully. More specifically, when a proxy forks the connection-request, in these two NAT situations, only the first forked connection can traverse the NAT, whereas all subsequent forked connections cannot traverse.

In the situation where the local endpoint is behind a PS NAT and the remote endpoints are behind a PC NAT, the local endpoint sends out a single external and port combination, and the NAT binding for the local endpoint is made when negotiating with the first responder to the connection request. A subsequent connection will come from a different address and port. Any subsequent responders have opened their port restricted cone filter to the first connection's address and port, thus preventing traffic from passing. Similarly, if the remote endpoints are behind a PS NAT, after NAT binding is made for the local endpoint, subsequent responders have opened their predicted symmetric NAT filter to only the first connection's address and port, thus preventing traffic from passing.

SIP-Based Rendezvous

For custodian-based routing in a CCN network, the point-to-multipoint NAT traversal problem arises when a device trying to establish multiple connections to a custodian with multiple logical endpoints via a rendezvous mechanism. Among possible rendezvous methods, SIP-based rendezvous has a number of advantages. One advantage is that many firewall vendors actively support peer-to-peer SIP and will automatically hole-punch UDP ports based on Session Description Protocol (SDP) content in SIP exchanges. Therefore, this disclosure uses SIP as an example for achieving the point-to-multipoint NAT traversal. In one embodiment, the mapping between a logical endpoint and its NEI is achieved using a public SIP proxy. In the example shown in FIG. 1, smartphone 108 can periodically register with SIP proxy 110 its current NEIs for all of its logical endpoints, with one register entry corresponding to a logical endpoint. Each register entry indicates where to register and the NEI of the corresponding logical endpoint. Note that, instead of registering with a public SIP proxy, it is also possible to distribute the logical-endpoint-to-NEI mapping information to all devices coupled to CCN 120. However, because the logical-endpoint-to-NEI mapping information changes frequently, and because such mapping is required to achieve content communication within CCN 120, it is unlikely to be useful to distribute such mapping. Nevertheless, there could be situations in which the distribution of the logical-endpoint-to-NEI mapping information can serve as a backup to the public SIP server, especially in cases where a device has a stable IP address or can be a directly reachable SIP endpoint.

In order to allow a remote device to establish a connection to smartphone 108, smartphone 108 needs to register a SIP identity with SIP proxy 110. The SIP identity can be a SIP-compliant identity for a device derived from the device's public key information. Such identity can be computable by any other devices with knowledge of the public key information. In one embodiment, smartphone 108 maintains one or more SIP register records. These register records specify the NEI of SIP proxy 110 at which smartphone 108 maintains the logical-endpoint-to-NEI mapping information.

After checking the SIP register record, laptop computer 102 identifies SIP proxy 110 as a possible proxy for communication with smartphone 108. In one embodiment, laptop computer 102 obtains the logical-endpoint-to-NEI mapping information for smartphone 108 from the register records. The register record for smartphone 108 also indicates whether multiple endpoints exist. For example, the SIP register record for smartphone 108 indicates that smartphone 108 has two logical endpoints reachable via SIP, the WiFi endpoint and the 3G cellular endpoint. Depending on the types of NAT being implemented, laptop computer 102 may attempt to connect to the multiple endpoints of smartphone 108 sequentially or parallelly. If laptop computer 102 detects itself being behind a symmetric NAT firewall, it may decide to use a sequential NAT strategy by trying to connect to the multiple endpoints of smartphone 108 sequentially; otherwise, it can use a parallel NAT strategy. However, in some cases, laptop computer may want to simultaneously establish connections to all endpoints in order to choose one that performs the best, even if PS NATs are implemented. To do so, special cares are needed in order to achieve the point-to-multipoint NAT traversal across the symmetric NATs. In some cases smartphone 108 may specify which endpoint has a higher preference level in the custodian-to-logical-endpoint mapping entry. Accordingly, laptop computer 102 will attempt to connect to the logical endpoint with the higher preference level first.

To start the rendezvous procedure, laptop computer 102 sends a connection request, such as a SIP INVITE, to the proxy server 110. The SIP INVITE is destined to the SIP identity of smartphone 108. In order to facilitate the point-to-multipoint NAT traversal, this SIP INVITE is not a conventional SIP INVITE, in a sense that it does not include any SDP payload. When SIP proxy 110 receives the INVITE and identifies that there are multiple logical endpoints registered for this SIP identity, SIP proxy 110 forks the INVITE (i.e., makes multiple copies) and forwards the forked INVITE to all registered logical endpoints. Note that because SIP proxy 110 is responsible for forking the single INVITE message to multiple endpoints, it needs to be a stateful SIP proxy.

In response to receiving the INVITE, smartphone 108 can respond to SIP proxy 110 with one or more 200/OK messages (as defined by Internet Engineering Task Force (IETF) RFC 3261, available at the IETF website at http://tools.ietf.org/html/rfc3261), each corresponding to a logical endpoint of smartphone 108. A 200/OK message contains an SDP offer specific to the corresponding logical endpoint. In one embodiment, the SDP offer includes a list of possible connection addresses (including ports) for each interface of smartphone 108. The list includes local address and port, as well as the external address and port for any NAT box an interface is behind. In a further embodiment, the list also includes the address of an external relay server.

SIP proxy 110 then relays the 200/OK messages to laptop computer 102, which in turn responds to each 200/OK message with an ACK message. The ACK message includes the SDP answer specific to laptop computer 102. In one embodiment, the SDP answer includes a list of possible connection addresses (including ports) for laptop computer 102. Note that, if the NAT strategy is sequential, laptop computer 102 will pace the ACK messages. When a logical endpoint of smartphone 108, such as its 3G cellular endpoint, receives an ACK message, it will launch a link adapter, and an interactive connectivity establishment (ICE) NAT negotiation begins between the 3G cellular endpoint and laptop computer 102. Details about ICE can be found in IETF RFC 5245, which is available at the IETF website (http://tools.ietf.org/html/rfc5245). Other NAT traversal techniques, such as session traversal utilities for NAT (STUN) and traversal using relay NAT (TURN) can also be used, depending on the type of NAT firewall. When the link adapter determines that the ICE negotiation is complete, the link adapter will send a message to indicate that the connection is ready for use.

By delaying identifying and sending the inviter's address and port and by allowing the SDP offer to be included in the 200/OK message sent from each invitee, embodiments of the present invention make it possible to establish point-to-multipoint connections across almost all types of NAT firewalls, with the exception of the RS NAT (which is impossible to traverse without an external relay server). Note that, if the NAT is a Cone NAT, then it is possible for the INVITE from laptop computer 102 to include the SDP offer, because the INVITE multiple connections can be established between the single address and port and the multiple endpoints of smartphone 108.

In cases where a custodian device has a SIP-friendly firewall, meaning that the device is able to keep a SIP endpoint hole punched in the firewall, a public SIP proxy is no longer needed for rendezvous. Instead, the custodian device can function as a directly reachable SIP endpoint, or as a private SIP proxy. In addition, no SIP proxy is needed if the custodian device has a public IP address.

Figure 5:
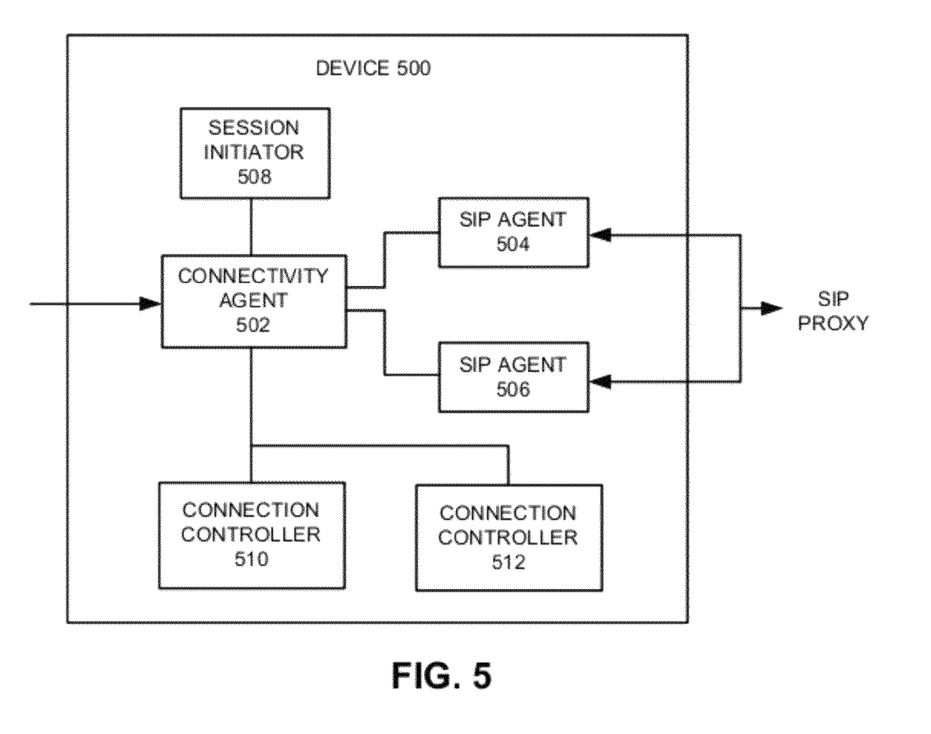
FIG. 5 presents a block diagram illustrating the architecture of a device capable of implementing a SIP-based rendezvous in accordance with an embodiment of the present invention.

FIG. 5 presents a block diagram illustrating the architecture of a device capable of implementing a SIP-based rendezvous in accordance with an embodiment of the present invention. Device 500 includes a connectivity agent 502, a number of SIP agents, such as SIP agents 504-506, a session initiator 508, and a number of connection controllers, such as connection controllers 510-512.

During operation, connectivity agent 502 receives an unsatisfied CCN interest from a CCN process, such as a CCN daemon (CCND), and determines how to connect to remote systems that may be able to satisfy the interest. Based on the content-prefix-to-custodian mapping, connectivity agent 502 determines which physical device (custodian) to connect to in order to satisfy the interest. Connectivity agent 502 provides SIP agents 504-506 the NEI of a public SIP proxy to use, along with the SIP identity of device 500. SIP agents 504-506, in turn contact the public SIP proxy and maintain SIP registrations for each logical endpoint (network interface). For example, SIP agent 504 maintains the SIP registration for a WiFi interface, whereas SIP agent 506 maintains the SIP registration for a 3G cellular interface. Note that the local address for an interface may change, and the corresponding SIP agent monitors the local interface address and keeps the SIP proxy registration up to date. The SIP agent needs to keep a communication path open with the SIP proxy. In one embodiment, the SIP agent uses feedback from the SIP proxy, such as in Via headers, to keep a proper registration.

When connectivity agent 502 determines that a session needs to be initiated with a remote device (in order to obtain a piece of content from the remote device), it passes the SIP identity of the remote device to session initiator 508, which in turn instructs a particular SIP agent to send a payload-less INVITE to the remote SIP identity via the SIP proxy. Note that the INVITE is not an SDP offer, because it does not include an SDP payload. If a SIP agent, such as SIP agent 504, receives an INVITE from a remote SIP identity, it will generate a 200/OK message that includes an SDP offer with a list of interface-specific NEIs, which can include a local address and port, a server reflective address and port, and a relay address. If a SIP agent receives a 200/OK message containing an SDP offer, it will construct an ACK with an SDP answer listing interface-specific NEIs, thus completing the SIP setup message exchange.

Connection controllers 510-512 are responsible for maintaining a link between a given pair of local and remote NEIs. When a SIP agent receives an ACK, it passes the 200/OK and ACK information to session initiator 508, which creates a connection controller for the specific interface. By using a NAT traversal library, such as ICE, a connection controller can connect to a remote device even in the presence of NAT firewalls.

Figure 6:
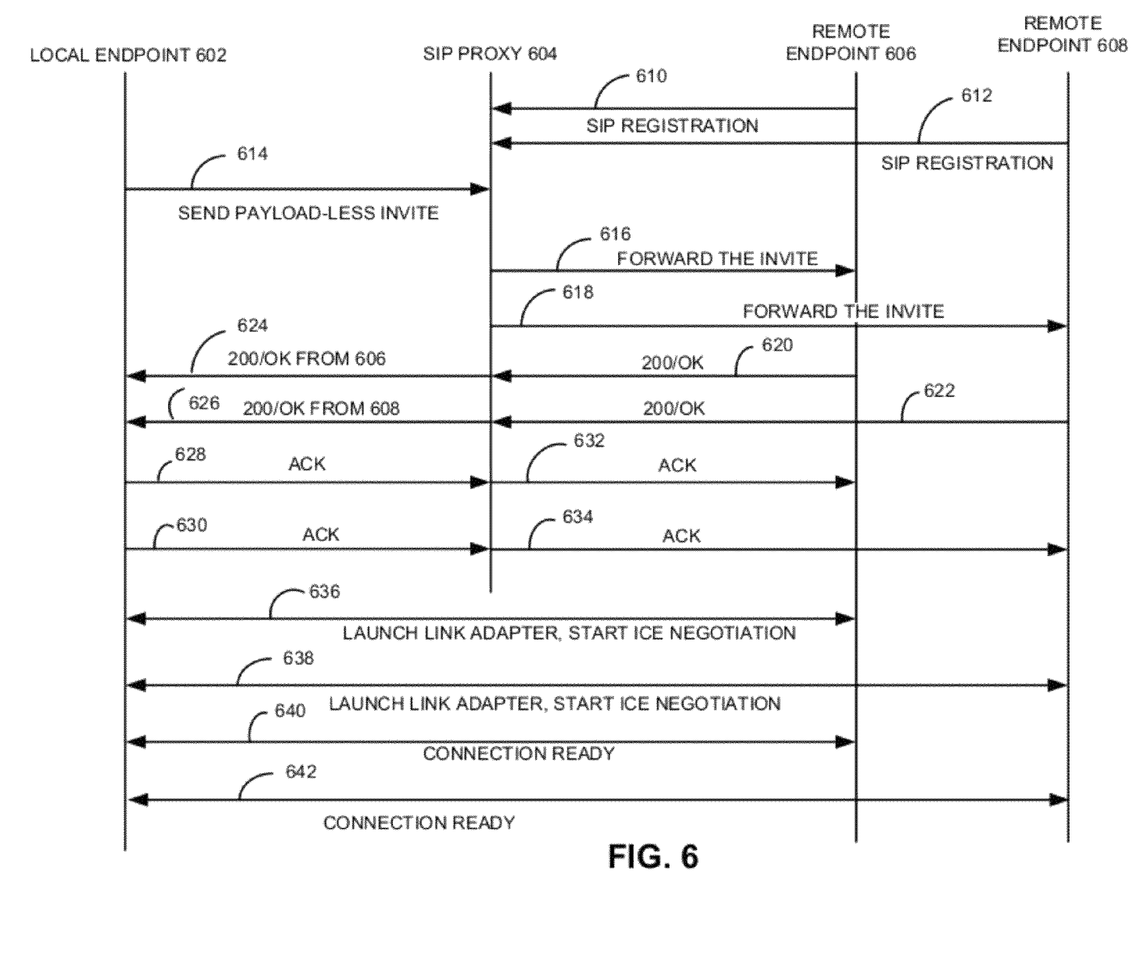
FIG. 6 presents a time-space diagram illustrating the process of a SIP-based rendezvous in accordance with an embodiment of the present invention.

FIG. 6 presents a time-space diagram illustrating the process of a SIP-based rendezvous in accordance with an embodiment of the present invention. Prior to allow any connection attempt, remote endpoints 606 and 608 need to register with a SIP proxy 604 (operation 610 and 612). In order to establish connections to remote endpoints 606 and 608, local endpoint 602 sends a payload-less INVITE message destined to a SIP identity corresponding to remote endpoints 606 and 608 to SIP proxy 604 (operation 614). Note that the payload-less INVITE does not include an SDP payload and, thus, is not an offer. SIP proxy 604 forks the single INVITE by forwarding an INVITE to endpoint 606 and an INVITE to endpoint 608 (operations 616 and 618). Upon receiving the INVITE message, each endpoint responds with a 200/OK message to SIP proxy 604 (operations 620 and 622). Each 200/OK message includes an SDP offer with a list of endpoint-specific NEIs, which may include the local address and port of the endpoint, the NAT external address and port, and an optional relay address. In a further embodiment, instead of a 200/OK message, a remote endpoint may send out the SDP offer in a SIP provisional response message. SIP proxy 604 relays the 200/OK messages back to local endpoint 602 (operations 624 and 626).

Upon receiving the 200/OK messages that include the SDP offers from remote endpoints 606 and 608, local endpoint 602 sends an ACK message to SIP proxy 604 for each 200/OK (operations 628 and 630). If the SDP offer is included in a SIP provisional response message, then local endpoint 602 sends a provisional response acknowledgement (PRACK) to SIP proxy 404. The ACK message includes an SDP answer, which may include the local address and port, the NAT external address and port, and an optional relay address for local endpoint 602. SIP proxy 604 forwards the ACK messages back to remote endpoints 606 and 608 (operations 632 and 634), thus completing the exchange of the SIP setup messages. Note that, if the local NAT strategy is sequential, local device 602 may pace sending the ACK messages. Once a pair of endpoints obtains possible connection addresses and ports from each other, they can launch a link adapter to start the ICE negotiation (operations 636 and 638). Once the ICE negotiation process is completed, the connection is ready for use (operations 640 and 642).

Note that sometimes a remote device, especially a mobile device, may be in power saving mode and therefore does not keep a cellular data connection or a WIFi connection open. As a result, the device is not reachable via SIP. In such cases, a local device may use other means, such as a text message or a phone call, to wake up the remote mobile device. Such out-of-band signaling is a bootstrap to cause the remote mobile device to bring up a data connection to begin SIP-based rendezvous. Note that the out-of-band signal is not used for rendezvous, but for initiating SIP registration and exchanges, so SIP-based rendezvous can proceed. Depending on the capabilities of the SIP proxy, devices can register a telephone number or other contacts with the SIP proxy to indicate an out-of-band wakeup method.

Also note that, because delaying the sending of the local address and port combination may result in a slower session-setup process, in cases where NAT can be easily traversed, such as when the local endpoint is behind a Cone NAT, the system can use a conventional NAT traversal method which can result in a faster session-set up process. In one embodiment, a local endpoint first determines what types of NAT it is behind. If it determines that it is behind a Cone NAT, then normal NAT traversal is performed. In the SIP case, the local endpoint can send out a conventional SIP INVITE that includes an SDP offer containing its connection address/port combination to the SIP proxy. On the other hand, if it determines that it is behind a predictable symmetric NAT, it will delay sending its own address and port combination by sending out a payload-less SIP INVITE.

Computer and Communication System

Figure 7:
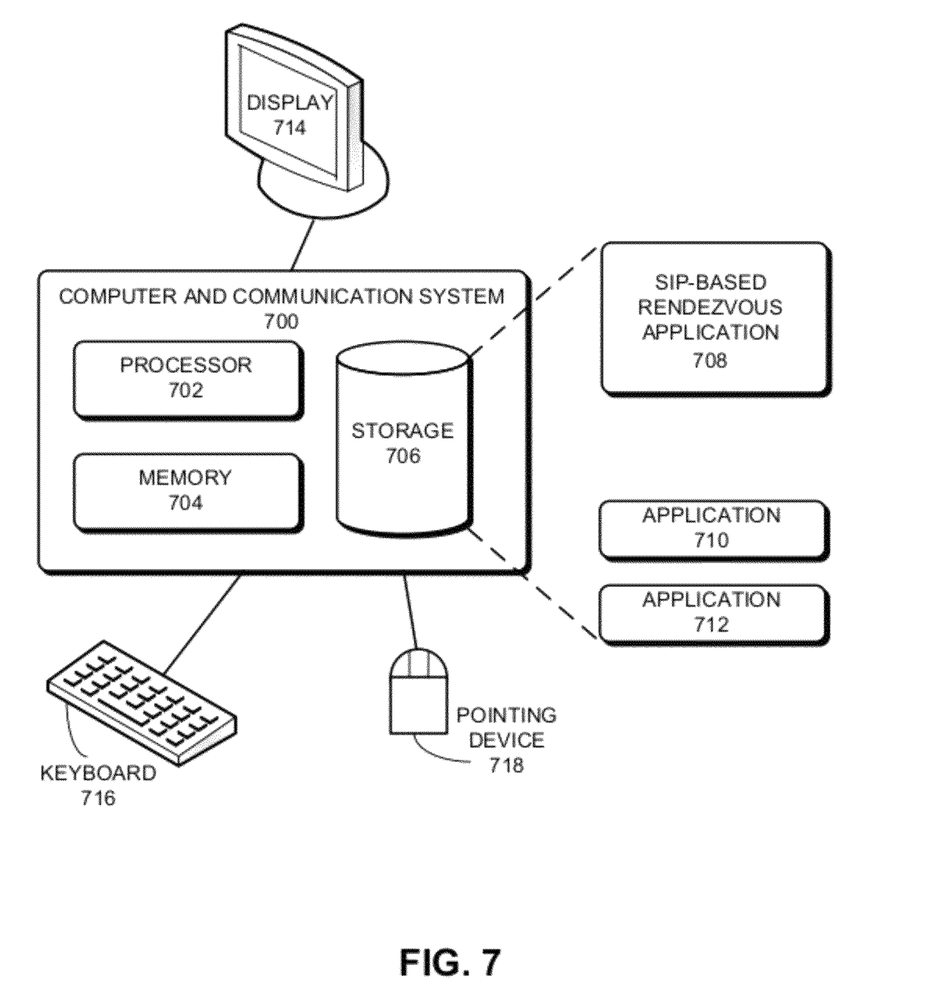
FIG. 7 presents an exemplary computer system for facilitating SIP-based rendezvous in accordance with an embodiment of the present invention.

FIG. 7 presents an exemplary computer system for facilitating SIP-based rendezvous in accordance with an embodiment of the present invention. In FIG. 7, a computer and communication system 700 includes a processor 702, a memory 704, and a storage device 706. Storage device 706 stores programs to be executed by processor 702. Specifically, storage device 706 stores a SIP-based rendezvous application 708, as well as other applications, such as applications 710 and 712. During operation, SIP-based rendezvous application 708 is loaded from storage device 706 into memory 704 and then executed by processor 702. While executing the program, processor 702 performs the aforementioned functions. Computer and communication system 700 is coupled to an optional display 714, keyboard 716, and pointing device 718.

Note that although this disclosure describe a rendezvous process using SIP to achieve point-to-multipoint NAT traversal, other types of message exchange are also possible for achieving the same purpose, as long as the inviter of the connect does not send out its address and port combination in the initial connection request.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for facilitating establishment of a session initiation protocol (SIP) connection between a local endpoint and a plurality of remote endpoints of a remote device, the method comprising:
   sending one or more packets, by the local endpoint, to at least one server according to session traversal utilities for network address translation (NAT) protocol;
   determining, by the local endpoint, a type of firewall that the local endpoint is situated behind based on replies from the at least one server indicating an address observed by the at least one server from which the one or more packets were sent;
   sending, by the local endpoint, a single connection-request message identifying the remote device to a proxy server, wherein the proxy server forks the single connection-request message to the plurality of remote endpoints of the remote device based on a registered mapping which correlates an address for each of the plurality of remote endpoints with the remote device, each of the plurality of remote endpoints comprising a communication interface for the remote device;
   receiving, from the proxy server, a 200/OK message being relayed by the proxy server from each of the plurality of remote endpoints of the remote device;
   determining, by the local endpoint, whether to connect sequentially or in parallel to each of the plurality of remote endpoints of the remote device based on the determined type of firewall that the local endpoint is situated behind; and
   establishing, at an application layer, a SIP connection between the local endpoint and each of the plurality of remote endpoints of the remote device by the local endpoint sequentially sending an acknowledgement corresponding to each of the received 200/OK messages to the corresponding remote endpoint of the plurality of remote endpoints via the proxy server, wherein the acknowledgements are paced between transmissions.

2. The method of claim 1, further comprising:
   in response to determining the local endpoint is not behind any NAT or behind a cone type NAT, sending a single connection-request message to the proxy server, wherein this connection-request message carries address information associated with the local endpoint.

3. The method of claim 1, further comprising:
   determining whether one or more remote endpoints are in an energy-saving sleep mode; and
   in response to the one or more remote endpoints being in the energy-saving sleep mode, waking up at least one of the remote endpoints using an out-of-band signal.

4. The method of claim 3, wherein the out-of-band signal includes a telephone call, a text message, or both.

5. The method of claim 1, wherein a 200/OK message carries a respective session offer.

6. The method of claim 5, wherein the session offer includes a list of addresses corresponding to a respective remote endpoint associated with a respective 200/OK message, wherein the list of addresses includes a NAT external address and port and may optionally include a local address and port and/or an external relay address.

7. The method of claim 1, wherein an acknowledgement carries a respective session answer.

8. The method of claim 7, wherein the session answers include a list of addresses corresponding to the local endpoint, and wherein the list of addresses includes a NAT external address and port and may optionally include a local address and port and/or an external relay address.

9. The method of claim 1, wherein the local endpoint and the remote endpoints are coupled to a content-centric network (CCN).

10. The method of claim 1, wherein the plurality of remote endpoints are behind a NAT firewall.

11. A computer device capable of establishing a session initiation protocol (SIP) connection between a local endpoint belonging to the computer device and a plurality of remote endpoints of a remote device, the computer device comprising:
   a processor;
   a memory;
   a connection analyzer, implemented with instructions stored in the memory and executed by the processor, to send one or more packets, by the local endpoint, to at least one server according to session traversal utilities for network address translation (NAT) protocol, and determine a type of firewall that the local endpoint is situated behind based on replies from the at least one server indicating an address observed by the at least one server from which the one or more packets were sent, wherein the connection analyzer determines whether to connect sequentially or in parallel to each of the plurality of remote endpoints of the remote device based on the determined type of firewall that the local endpoint is situated behind;
   a connection-request sender, implemented with instructions stored in the memory and executed by the processor, to send, by the local endpoint, a single connection-request message identifying the remote device to a proxy server, wherein the proxy server forks the single connection-request message to the plurality of remote endpoints of the remote device based on a registered mapping which correlates an address for each of the plurality of remote endpoints with the remote device, each of the plurality of remote endpoints comprising a communication interface for the remote device;
   a receiver, implemented with instructions stored in the memory and executed by the processor, to receive, from the proxy server, a 200/OK message being relayed by the proxy server from each of the plurality of remote endpoints of the remote device; and
   a connector, implemented with instructions stored in the memory and executed by the processor, to establish, at an application layer, a SIP connection between the local endpoint and each of the plurality of remote endpoints of the remote device by the local endpoint sequentially sending an acknowledgement corresponding to each of the received 200/OK messages to the corresponding remote endpoint of the plurality of remote endpoints via the proxy server, wherein the acknowledgements are paced between transmissions.

12. The computer device of claim 11, wherein the local endpoint, the plurality of remote endpoints, or both are respectively behind a network address translation (NAT) firewall.

13. The computer device of claim 12, further comprising a determinator, implemented with instructions stored in the memory and executed by the processor, to perform the determining of the type of NAT firewall behind which the local endpoint resides, wherein, in response to the local endpoint not being behind any NAT or behind a cone type NAT, the connection-request sender sends a single connection-request message to the proxy server, wherein this connection-request message carries address information associated with the local endpoint.

14. The computer device of claim 11, further comprising:
   a second determinator, implemented with instructions stored in the memory and executed by the processor, to determine whether one or more remote endpoints are in an energy-saving sleep mode; and a waker, implemented with instructions stored in the memory and executed by the processor, to wake up at least one of the remote endpoints using an out-of-band signal, in response to the one or more remote endpoints being in the energy-saving sleep mode.

15. The computer device of claim 14, wherein the out-of-band signal includes a telephone call, a text message, or both.

16. The computer device of claim 11, wherein a 200/OK message carries a respective session offer.

17. The computer device of claim 16, wherein the session offer includes a list of addresses corresponding to a respective remote endpoint associated with a respective 200/OK message, wherein the list of addresses includes a NAT external address and port and may optionally include a local address and port and/or an external relay address.

18. The computer device of claim 11, wherein an acknowledgement carries a respective session answer.

19. The computer device of claim 18, wherein the session answers include a list of addresses corresponding to the local endpoint, and wherein the list of addresses includes a NAT external address and port and may optionally include a local address and port and/or an external relay address.

20. The computer device of claim 11, wherein the local endpoint and the remote endpoints are coupled to a content-centric network (CCN).

21. The computer device of claim 11, wherein the plurality of remote endpoints are behind a NAT firewall.

22. A non-transitory computer-readable storage medium storing instructions which when executed by a computer cause the computer to perform a method for facilitating establishment of a session initiation protocol (SIP) connection between a local endpoint and a plurality of remote endpoints of a remote device, the method comprising:
   sending one or more packets, by the local endpoint, to at least one server according to session traversal utilities for network address translation (NAT) protocol;
   determining, by the local endpoint, a type of firewall that the local endpoint is situated behind based on replies from the at least one server indicating an address observed by the at least one server from which the one or more packets were sent;

sending, by the local endpoint, a single connection-request message identifying the remote device to a proxy server, wherein the proxy server forks the single connection-request message to the plurality of remote endpoints of the remote device based on a registered mapping which correlates an address for each of the plurality of remote endpoints with the remote device, each of the plurality of remote endpoints comprising a communication interface for the remote device;

receiving, from the proxy server, a 200/OK message being relayed by the proxy server from each of the plurality of remote endpoints of the remote device;

determining, by the local endpoint, whether to connect sequentially or in parallel to each of the plurality of remote endpoints of the remote device based on the determined type of firewall that the local endpoint is situated behind; and establishing, at an application layer, a SIP connection between the local endpoint and each of the plurality of remote endpoints of the remote device by the local endpoint sequentially sending an acknowledgement corresponding to each of the received 200/OK messages to the corresponding remote endpoint of the plurality of remote endpoints via the proxy server, wherein the acknowledgements are paced between transmissions.

23. The non-transitory computer-readable storage medium of claim 22, wherein a 200/OK message includes a respective list of addresses which corresponds to a remote endpoint associated with the 200/OK message and which includes a NAT external address and port, and may optionally include a local address and port and/or an external relay address; and wherein an acknowledgement includes a respective list of addresses which corresponds to the local endpoint and which includes a NAT external address and port, and may optionally include a local address and port and/or an external relay address.

* * * * *